United States Patent [19]
Kim et al.

[11] 3,914,365
[45] Oct. 21, 1975

[54] METHODS OF MAKING NETWORK STRUCTURES

[75] Inventors: Charles W. Kim, Wilmington; Chia-Seng Liu, Newark, both of Del.

[73] Assignee: Hercules Incorporated, Wilmington, Del.

[22] Filed: Jan. 16, 1973

[21] Appl. No.: 324,030

[52] U.S. Cl. ............ 264/147; 28/DIG. 1; 156/267; 156/167; 156/229; 264/210 R; 264/284; 264/DIG. 47
[51] Int. Cl.² .......................................... B29H 7/18
[58] Field of Search............ 264/141, 147, DIG. 47, 264/175, 284, 140; 161/402; 57/140 R; 156/167, 181, 229, 209, 219, 267; 28/1, 71.3, DIG. 1; 425/363, 396, 369, 327, 328, 66

[56] References Cited
UNITED STATES PATENTS

| | | | |
|---|---|---|---|
| 1,150,805 | 8/1915 | Beran.................................. | 425/369 |
| 3,085,292 | 4/1963 | Kindseth............................ | 264/175 |
| 3,387,077 | 6/1966 | Sammons et al.................... | 264/289 |
| 3,394,431 | 7/1968 | Halle.................................. | 264/167 |
| 3,441,638 | 4/1969 | Patchell et al...................... | 264/154 |
| 3,488,415 | 1/1970 | Patchell et al...................... | 264/154 |
| 3,500,627 | 3/1970 | Kim .................................... | 57/140 |
| 3,505,157 | 4/1970 | Fields et al. ........................ | 161/402 |
| 3,511,901 | 5/1970 | Brown................................. | 264/147 |
| 3,551,544 | 12/1970 | Hlinka ............................... | 269/284 |
| 3,672,013 | 6/1972 | Vernon et al....................... | 28/71.3 |
| 3,719,540 | 3/1973 | Hall .................................... | 156/267 |
| 3,724,198 | 4/1973 | Kim.................................... | 57/140 R |
| 3,825,391 | 7/1974 | Davis.................................. | 425/362 |

FOREIGN PATENTS OR APPLICATIONS

| | | | |
|---|---|---|---|
| 726,089 | 1/1966 | Canada.............................. | 264/175 |
| 43-13359 | 6/1968 | Japan........................... | 264/DIG. 47 |
| 1,267,031 | 3/1972 | United Kingdom................. | 264/147 |

*Primary Examiner*—Jay H. Woo
*Attorney, Agent, or Firm*—Stanley A. Becker

[57] ABSTRACT

Methods of making network structures include forming on one side of a sheet of thermoplastic polymer a plurality of parallel continuous main ribs and forming on the other side of the sheet in a different direction a plurality of continuous parallel tie ribs, with the ratio of cross-sectional areas of the main ribs to the tie ribs preferably being 1.5:1 or greater and the ratio of the height of the main ribs to the thickness of the webs between the main ribs being 3:1 or greater. The ribbed sheet thus formed is drawn in either one direction or in two preferably perpendicular directions to open the sheet into a network structure and to orient the main ribs and preferably also to orient the tie ribs.

23 Claims, 22 Drawing Figures

METHODS OF MAKING NETWORK STRUCTURES

BACKGROUND OF THE INVENTION

This invention relates to new and improved network structures and methods for making such network structures, and particularly to network structures and methods for making them by embossing or forming ribs in both sides of a thermoplastic polymeric sheet in a particular manner so as to permit spontaneous fibrillation or opening of the network structure upon drawing in one direction or in two preferably perpendicular directions and to provide a uniform open network structure having desirable strength characteristics.

In the manufacture of networks, it has previously been proposed to form continuous diagonal grooves in one direction in one side of a sheet of plastic material and continuous diagonal grooves in the opposite direction on the other side of the sheet so that upon subjecting the sheet to biaxial stretching the thin parts of the sheet, at the crossing points of the grooves, split and form perforations thereby opening the material into a network. For example, see U.S. Pat. No. 3,488,415 to A. G. Patchell et al. The networks therein disclosed are formed in such a manner as to have thicker masses at the points where the ridges cross, which behave as discrete areas of reinforcement, since on biaxial stretching or drawing of the embossed sheet the thick areas where the ridges cross orient only to a limited extent if at all. The tensile strength and tear characteristics of such a network are relatively poor because the presence of the unoriented thick areas weakens the tensile strength and tear resistance of the network so prepared, and such a network is not uniform in appearance. U.S. Pat. No. 3,500,627 to Charles W. Kim discloses making yarn by forming on one side of a ribbon of plastic material a plurality of parallel filament forming ribs and on the other side a plurality of fibril forming cross-ribs arranged at an acute angle to the filament forming ribs. The ribbon is then uniaxially oriented and mechanically fibrillated by means of a toothed fibrillating device to break the fibril forming ribs and form a yarn having fibrils extending laterally therefrom. Use of mechanical fibrillation makes reproducing uniform network structures very difficult.

SUMMARY OF THE INVENTION

The subject invention relates to network structures and methods of making network structures by forming on one side of a sheet of thermoplastic polymeric material a plurality of parallel continuous main ribs interconnected by webs of reduced thickness, and forming on the other side of the sheet a plurality of parallel continuous tie ribs interconnected by webs of reduced thickness. The tie ribs are formed at any desired angle to the main ribs. The main ribs preferably have a cross-sectional area which is at least 1.5 times as great as the cross-sectional area of the tie ribs, and the main ribs have a height which is at least three times as great as the thickness of the webs between the main ribs. By forming the main ribs and tie ribs with a cross-sectional area ratio of at least 1.5:1 and a main rib height to web thickness ratio of at least 3:1, it is possible, among other things, to spontaneously open or fibrillate the ribbed sheet into a network by drawing, and to orient the main ribs continuously and uniformly, thereby making the main ribs very strong. It is this feature which provides a network structure having high tensile strength in the direction parallel to the main ribs. Additionally, by having continuous main ribs which are uniformly oriented, the tear strength in the direction across the main ribs is greatly enhanced.

After the main and tie ribs are formed in the plastic sheet the sheet is drawn in a direction to effect orientation of the main ribs continuously and uniformly, and may be drawn in two different, preferably perpendicular, directions to orient both the main and the tie ribs. For example, when the main ribs are formed in the machine direction and the tie ribs are formed in the cross-machine direction a network structure may be formed with only one draw, in this instance in the machine direction. Alternatively, a more open network structure can be formed by sequential or simultaneous drawing in both the machine and cross-machine directions. In sequential drawing of a sheet having main ribs in the machine direction, the first draw is customarily in the cross-machine direction. Upon drawing, the thinnest areas in the sheet namely the areas where the webs between the main ribs cross the webs between the tie ribs, become oriented and normally open up spontaneously, leaving a uniform pattern of holes or voids in the sheet. Under some conditions and levels of draw the web openings may not occur during the initial draw but may occur only during the subsequent perpendicular draw. In any event, the web openings occur spontaneously and thus there is no need for mechanical fibrillation. This spontaneous fibrillation or opening of the webs converts or forms the tie ribs into tie filaments and the main ribs into main filaments. Hereinafter, the term tie ribs shall be used to refer to the tie ribs embossed on the sheet which are ordinarily interconnected by webs. After the webs split or open up, the tie ribs are separated and will be referred to as tie filaments. Likewise, the main ribs are referred to as main ribs while interconnected by webs, but after the webs split or open, the main ribs are separated and will be referred to as main filaments. These main filaments are continuous if in the machine direction, or if at an angle to the machine direction, are continuous from one edge of the sheet to the other.

It has been found that highly desirable strength characteristics are obtainable in a network structure having main filaments in one direction crossed by tie filaments in another direction wherein the main filaments are dominant in size so that all, or substantially all, of the orientation at the cross-over points of the main and tie filaments is applicable to the main filaments. The tie filaments are normally smaller and are usually oriented to provide sufficient structural integrity for the network structure, tending to keep it flat and prevent folding, thus maintaining the main filaments in parallel and uniformly spaced relation. The single layer plastic network structures thus formed are dimensionally stable, self-supporting, easy to handle, and have high tensile strength in the direction of the main filaments and high tear resistance in the other direction. Such nets are particularly useful for reinforcing paper products and nonwoven fabrics based on staple fibers and for covering absorbent pads.

Additionally, the network structures so formed may be made into multi-layer fabrics by bonding together two or more layers of network structures having the same or different configurations so that the main filaments cross in various directions to provide a multi-layered product having certain desired strength characteristics. For example, orthogonal constructions can be made wherein the main filaments of one layer cross at 90° to the main filaments of another layer to simulate the appearance and physical properties of woven fabrics and to provide high strength and tear resistance in two directions. Diagonal constructions, wherein the main filaments of the two layers cross preferably at about 90° to each other with the main filaments of both layers being at an angle to the machine direction of the fabric, possess stretch and recovery properties in the machine direction similar to those of knitted fabrics. Fabrics made from three or more layers of networks each having the main filaments in different directions have excellent dimensional stability, high strength and tear resistance in all directions and high burst strength. For example, triaxial constructions, wherein a diagonal construction is utilized having interposed between the two layers a network having main filaments formed in the machine direction, provide high bursting strength with minimum weight. Isometric constructions, wherein the main filaments of at least four layers are positioned at about 45° angles to each other, provide strength in all directions with dimensional stability heretofore unattainable in woven, knit or other nonwoven fabric structures with equivalent unit weight.

Additionally, the subject network structures which have main filaments in the machine direction can be made into monofilaments, tapes or yarns by separating the network structure into strips which may be subsequently fibrillated and twisted or bulked to entangle the main filaments of the strips. If desired, the strips may also be crimped or false twisted.

Other advantages of the present invention will be apparent from the following detailed description of the invention when considered in conjunction with the following detailed drawings, which drawings form a part of the specification. It is to be noted that the drawings illustrate only typical embodiments of the invention and are therefore not to be considered limiting of its scope, for the invention may admit to other equally effective embodiments.

DESCRIPTION OF THE INVENTION

Figure 1:
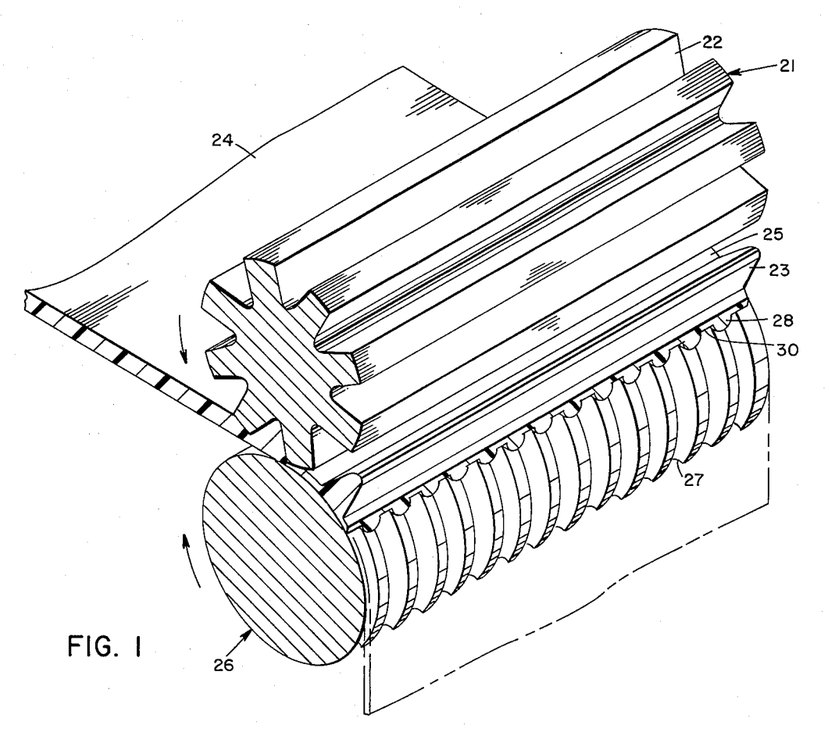
FIG. 1 is a perspective schematic view illustrating apparatus for embossing ribs on both sides of an advancing sheet of plastic material in accordance with the principles of this invention.
Figure 2:
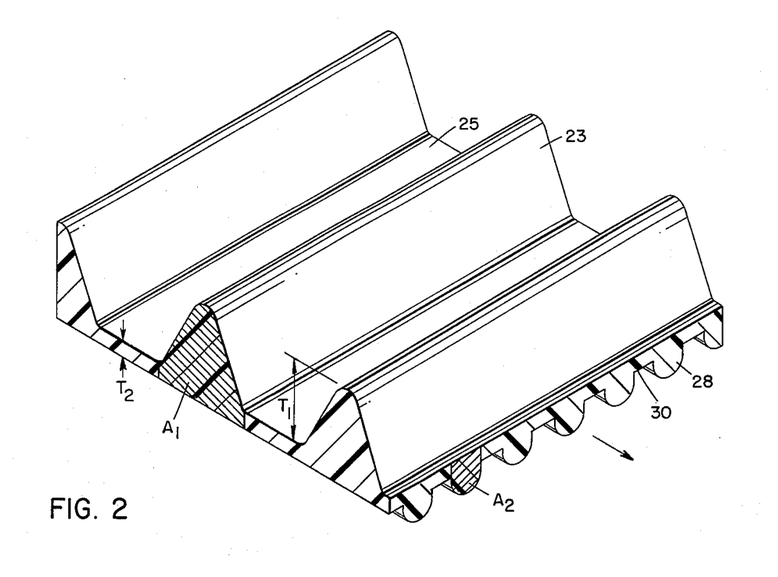
FIG. 2 is an enlarged perspective view of a portion of the embossed sheet shown in FIG. 1.

Referring now to FIGS. 1 and 2, there is shown an embossing roll 21 having a plurality of grooves 22 formed therein for forming a plurality of transverse main ribs 23 on an advancing sheet of thermoplastic polymer material 24 with the ribs 23 being interconnected by webs 25 of reduced thickness. Another embossing roll 26 having a plurality of annular or helical grooves 27 formed therein is positioned opposite roll 21 for forming a plurality of longitudinal tie ribs 28 on the other side of the sheet 24 with the tie ribs being interconnected by webs 30 of reduced thickness. The embossing rolls 21 and 26 rotate in the direction shown by the arrows. There are a variety of different ways to effect the double embossing described herein. One method is to feed a molten plastic sheet, such as 24, coming directly from an extrusion die into the nip of two counter-rotating embossing rolls, such as 21 and 26, which are urged toward each other by facilities which are not shown. The desired separation between the rolls and ultimately the thickness of the embossed sheet is readily controlled by regulating thickness of the extruded sheet entering the embossing rolls and the pressure between the two embossing rolls. The roll temperatures typically are internally controlled and serve to quench and solidify the molten plastic forming the desired embossed patterns on each side.

Alternatively, a previously cast flat sheet or film may be re-heated to its softening temperature and then advanced through a pair of embossing rolls, such as 21 and 26. Another method may utilize a polymer which is in powder form and which is introduced into the nip between two heated rolls, not shown, to permit the heated rolls to melt and soften the polymer and form it into a sheet which is then advanced between two embossing rolls such as 21 and 26. An additional method is to pass a previously cast flat sheet or film between two embossing rolls pressed together under a sufficiently high pressure that the embossed patterns are pressed into the sheet without having to melt or soften the sheet. It is evident that many embossing techniques may be utilized to carry out the principles of this invention. Alternatively, instead of using embossing rolls to form the desired ribbed configuration on both sides of a sheet, such a configuration may also be accomplished by using a pair of relatively movable concentric dies such as shown and described in the aforementioned U.S. Pat. No. 3,488,415.

It has been found that the most advantageous range of the ratio of the cross-sectional area of the main ribs, to the cross-sectional area of the tie ribs is between 1.5:1 to 100:1 with the ratio of the height of the main ribs to the thickness of the webs between the main ribs being at least 3:1 or greater. This relationship permits subsequent drawing and orientation steps to form the ribbed sheet into a network structure having uniformly spaced main filaments oriented uniformly and continuously along their lengths and being quite uniform in cross-section. With continuous tie ribs and cross-sectional area ratios less than 1.5, uniform continuous orientation of the main filaments is not obtained, except with special polymers, or special embossing conditions or methods as described for example, in copending application Ser. No. 324,028, because of a tendency for there to be thick areas where the main filaments and tie filaments cross and for those areas to remain either unoriented or only slightly oriented on drawing. As shown in FIG. 2, the cross-sectional area $A_1$ of the main ribs and the cross-sectional area $A_2$ of the tie ribs each includes the web area adjacent to the base of each respective rib. Also identified in FIG. 2 is the height $T_1$ of the main ribs and the thickness $T_2$ of the webs interconnecting the main ribs.

The cross-sectional shape of the ribs formed may vary. They may be semi-circular, rectangular, triangular, truncated, or any other desired shape. Furthermore, the shapes of the main and tie ribs may be the same or different. Likewise, the shape and size of the grooves separating the main or tie ribs is not critical. The grooves may be narrow so that the ribs are close together, or wide so that the ribs are more widely separated. Furthermore, the tie ribs may be spaced farther apart than the main ribs or vice versa. The size of the openings in the network structure may be controlled to some degree by controlling the spacing of the main and tie ribs.

Figure 3:
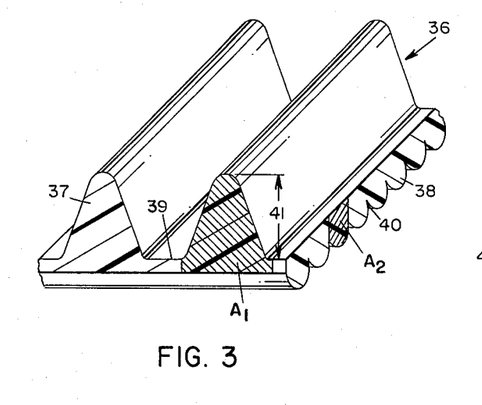
FIG. 3 is an enlarged perspective view of a portion of an embossed sheet having main ribs which are spaced relatively far apart and have relatively deep grooves therebetween and tie ribs which are spaced close together and have relatively shallow grooves therebetween.
Figure 4:
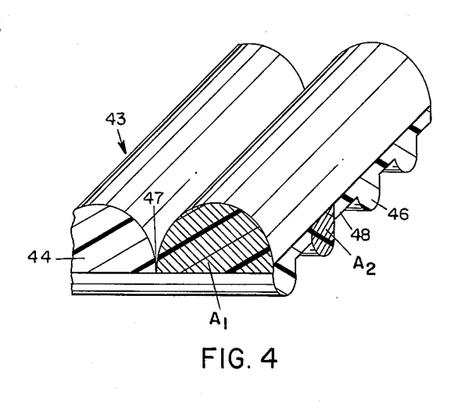
FIG. 4 is an enlarged perspective view of a portion of another embossed sheet having main ribs which are spaced relatively close together and have shallow grooves therebetween and tie ribs which are spaced relatively far apart and have relatively deep grooves therebetween.

Referring to FIG. 3, there is shown a portion of an embossed sheet identified generally as 36 having a plurality of main ribs 37 formed on one side of the sheet, and a plurality of tie ribs 38 formed on the other side of the sheet in a direction perpendicular to the direction of the main ribs 37. The main ribs 37 are spaced farther apart than the tie ribs and have relatively wide webs 39 of reduced thickness therebetween. The tie ribs 38, however, have almost no web therebetween, but there is an area or line of reduced thickness at 40 between each pair of adjacent tie ribs. Note that the height 41 of the main rib 37, which is measured from the web 39 to the top of the main rib 37, is much greater than the height of the tie rib 38 which is measured from the bottom of 40 to the top of tie rib 38. However, referring now to FIG. 4 there is shown an embossed sheet generally designated as 43 having a plurality of closely spaced main ribs 44 formed in one direction on one side of the sheet, and a plurality of spaced apart tie ribs 46 formed on the other side of the sheet in another direction. The web which is the line or area of reduced thickness 47 between the main ribs 44 is now very small, while the web 48 between the tie ribs 46 is relatively larger. Thus, it can be seen that the invention is relatively independent of the spacing between the ribs and the height of the ribs.

Additionally, the direction of the main ribs is not critical. The main ribs may be formed in the machine direction of the sheet, or transverse to the machine direction, i.e., 90° thereto, or at any angle in between. With the main ribs formed in either the machine direction or the transverse direction, orienting the main ribs along their longitudinal axes is easily accomplished by use of either a conventional linear differential speed draw roll device or a conventional tenter. Likewise, if the embossed ribs are diagonal to the machine direction, orientation of the ribs and net formation may be achieved using the same type of equipment. In orienting main ribs which are formed at an angle to the machine direction along their longitudinal axes, it is sometimes advantageous to utilize a long draw gap linear drawing unit so that upon drawing in the machine direction the sheet is permitted to neck down and cause orientation of the main ribs principally along their longitudinal axes. In drawing in such a manner, it is usually desirable that the linear draw be preceded by a cross-machine direction orientation by passing the sheet through a tenter.

The direction of the tie ribs on the reverse side of the sheet should be at an angle to that of the main ribs, which in many cases is desirably 90°, but can also be other angles. Any angle between about 15° and 90° between the directions of the main ribs to the tie ribs is acceptable.

Figure 5:
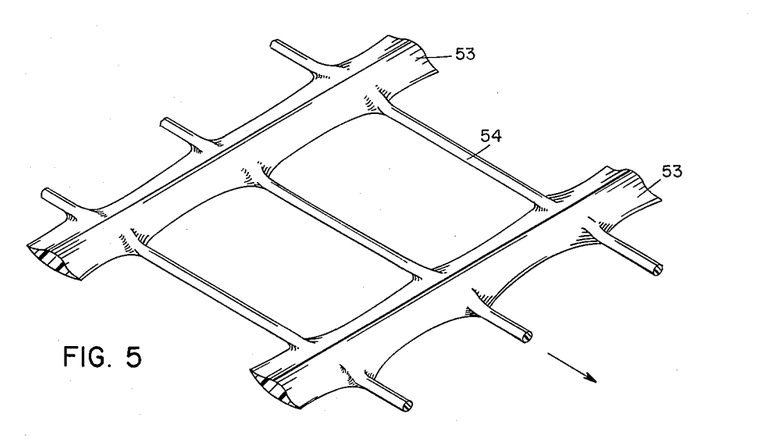
FIG. 5 is an enlarged perspective view of a portion of the top of a network structure obtained after drawing and orienting the embossed sheet shown in FIG. 2 in two directions.
Figure 6:
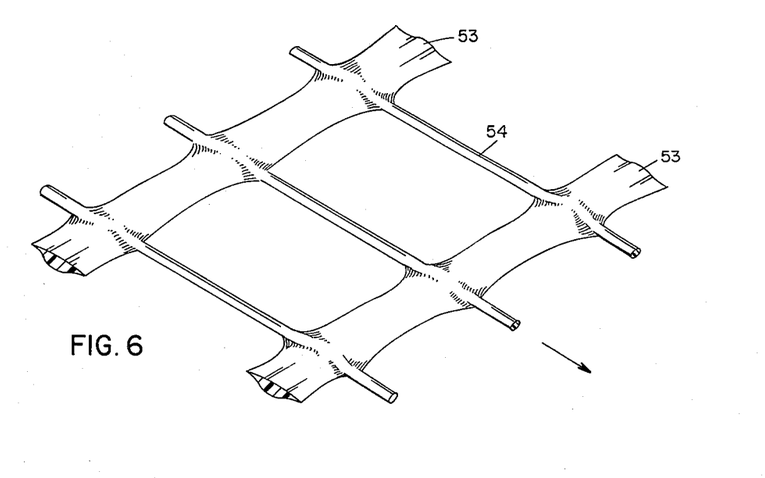
FIG. 6 is an enlarged perspective view of the bottom of the network structure shown in FIG. 5.

When the embossed sheet having a first pattern of continuous main ribs on one side and a second pattern of continuous tie ribs on the other side is drawn, the thin areas of the sheet, namely the areas where webs 25 and 30 cross, spontaneously split, forming openings. After the second draw is completed, a network structure such as or similar to that shown in FIGS. 5 and 6 is achieved. The main ribs 23 of the embossed sheet shown in FIGS. 1 and 2 have been separated into main filaments 53 which are oriented continuously and uniformly. The tie ribs 28 have also been separated and oriented into tie filaments 54 which interconnect the main filaments 53 and keep them uniformly spaced apart. FIG. 6 shows the back side of the network shown in FIG. 5 wherein it can be seen that the tie filaments 54 may extend continuously and without interruption across the main filaments 53.

In drawing the embossed sheet, the preferred amount of draw would depend on such factors as the polymer employed, the embossing pattern employed, and the degree of separation of the main filaments desired in the final network structure. Customarily, the first drawing or orientation step involves drawing the embossed sheet in a direction generally transverse to the direction of the main ribs to cause orientation of the thinner areas of plastic material between the main ribs. Referring, for example, to the embossed sheet shown in FIG. 2, since the main ribs 23 are formed in the cross-machine direction, the first draw would normally be, but is not necessarily, in the machine direction. This draw could be effected by using conventional linear differential speed draw rolls. This orientation, which is usually 1.5X or greater, generally results in incipient or actual voids or openings being formed between the main ribs with the formation of small tie filaments spanning the openings between the main, as yet unoriented, ribs or filaments. Drawing to an extent greater than five times its original length (5X) at this stage is usually undesirable since cross-orientation of the polymer at the cross-over points of the main ribs and tie ribs may occur. This may interfere with the desired uniform orientation of the main filaments in the subsequent drawing steps.

As an alternative, it may be desirable to carry out an initial draw such as, for example, up to 2X, in the direction of the main ribs prior to the drawing step transverse to this direction. This initially orients and strengthens the main ribs and tends to prevent any possible distortion or development of cross-orientation of the polymer in the cross-over areas during the transverse orientation.

The second orientation step is normally carried out in a direction generally parallel to the main ribs. Thus, referring again to the embossed sheet shown in FIG. 2, the second orientation would be in the cross-machine direction. This transverse drawing step, could be carried out on a conventional tenter. The transverse draw causes orientation of the main ribs along their longitudinal axes and separation of the small, connecting tie filaments. The amount of draw will determine the strength and size of the resulting main filaments. It can vary from as low as 1.5X to 10X or greater. The maximum draw will depend on the orientation characteristics of the polymer employed, among other things. Temperatures for drawing will vary depending upon the polymer employed but generally will be slightly lower than those employed for orienting flat sheets of the same polymer. While reference has been made to first and second sequential drawing steps, both draws may be carried out simultaneously, if desired.

Figure 7:
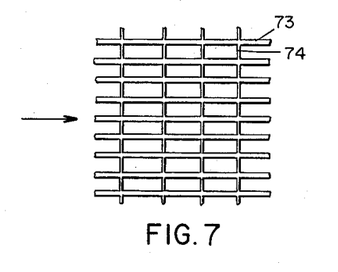
FIG. 7 is a plan view illustrating a portion of a network structure having main filaments in the machine direction and tie filaments in the cross-machine direction.
Figure 8:
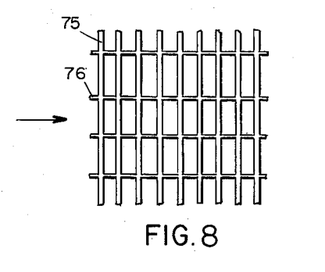
FIG. 8 is a plan view illustrating a portion of a network structure having main filaments in the cross-machine direction and tie filaments in the machine direction.
Figure 9:
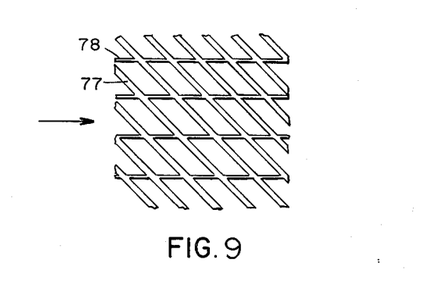
FIG. 9 is a plan view illustrating a portion of a network structure having main filaments formed at an angle to the machine direction with tie filaments formed in the machine direction.
Figure 10:
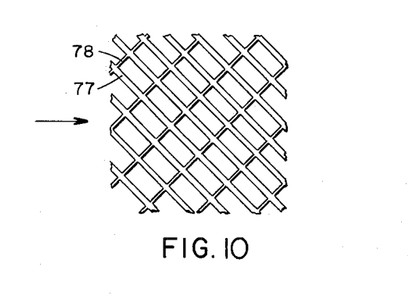
FIG. 10 is a plan view illustrating a portion of a network structure having main filaments formed at an angle to the machine direction with tie filaments formed perpendicular to the main filaments.

The network structures produced by the foregoing methods contain as desired longitudinal, transverse or oblique oriented main filaments interconnected by normally lower denier, oriented tie filaments, with the main filaments having orientation continuously over their lengths. Examples of the different configurations of network structures that can be made are shown in FIGS. 7, 8, 9 and 10. In FIG. 7, a network structure is shown having main filaments 73 extending in the machine direction, the direction of the arrow, and tie filaments 74 being formed in the cross-machine direction 90° to the machine direction. In FIG. 8, the main filaments 75 are formed transverse to the machine direction, indicated by the arrow, and the tie filaments 76 are formed parallel to the machine direction. In FIG. 9, the main filaments 77 are formed at an angle to the machine direction, shown by the arrow, and the tie filaments 78 are formed parallel to the machine direction. Alternatively, the tie filaments 78 may be formed in the cross-machine direction or so they are perpendicular to the main filaments such as shown in FIG. 10. When the main filaments 77 are formed at an angle of 75° or less to the machine direction, in order to orient such filaments, it is sometimes desirable to draw in the machine direction while permitting necking down of the network structure. Ordinarily, in making this configuration, the cross-machine draw in a tenter, if desired, comes first, followed by the machine direction draw allowing neck-down. It is apparent that many other configurations of network structures may be made in accordance with the principles of this invention, having the main filaments at any desired angle wherein maximum tensile strength is desired and the tie filaments formed at an angle relative to the main filaments.

The network structures described herein have good tensile strength in the direction of the main filaments which reflects the degree and uniformity of orientation along the length of these filaments. This strength is lower in the opposite direction because of the smaller size of the interconnecting tie filaments. The tear strength is high in the direction transverse to the main filaments because of the strength of the main filaments. It is to be noted that the network structures such as shown in FIGS. 5 and 6 have tie filaments which are continuous and cross over the main filaments or integrally join the main filaments, without there being notches at the junctures as is characteristic of many network structures prepared by previous methods. Such notches at the junctions or cross-overs enable a network to tear easily in either direction.

Figure 11:
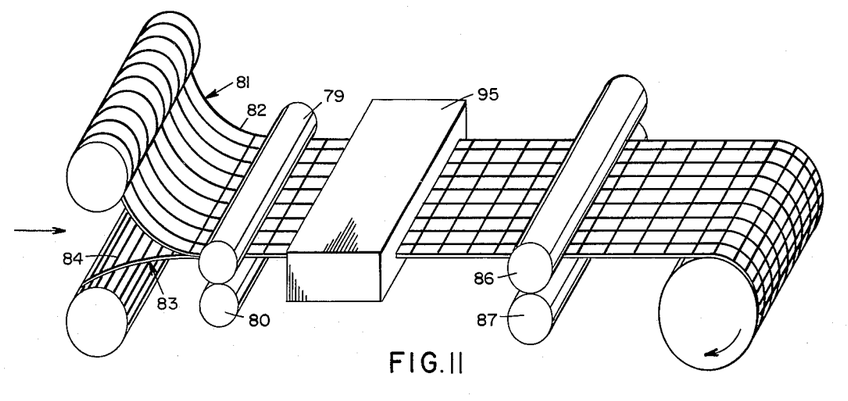
FIG. 11 is a perspective schematic view illustrating apparatus for making multi-layer fabric structures in accordance with the principles of the subject invention.

The subject network structures, while useful as single layer network structures, may also be employed to prepare very useful multi-layer fabric structures. Referring to FIG. 11, there is shown one network structure, generally designated as 81, having main filaments 82 formed in the machine direction and tie filaments, not shown, formed in the cross-machine direction being laminated or bonded to a second network structure, generally designated as 83, having main filaments 84 formed in the cross-machine direction. Tie filaments are not shown in any of the network structures shown in FIGS. 11–16 to facilitate illustration and description of the fabric structures. Nevertheless, the tie filaments are present in each network and may be assumed to be as shown in FIGS. 7–10 or as previously described. One way of bonding the two network structures 81 and 83 together is to pass them through rolls 79 and 80 into a preheater 84 to heat the networks under tension without adversely affecting the orientation thereof and then advance them into the nip of two heated calender rolls 86 and 87 to bond the plastic materials to each other. Rolls 79 and 80 rotate very slightly slower than rolls 86 and 87 to maintain the networks 81 and 83 under tension during heating to avoid loss of orientation. Likewise, it may be desirable to use a tenter, a series of closely spaced rolls or other means to prevent lateral shrinkage of the networks in this area. This bonding or lamination process forms a two-layer fabric which has the appearance and physical properties of a woven fabric having high strength and good tear resistance in both the machine and cross-machine directions. Such a fabric has substantially no stretch in the machine and cross-machine directions, but does stretch on the bias.

Figure 12:
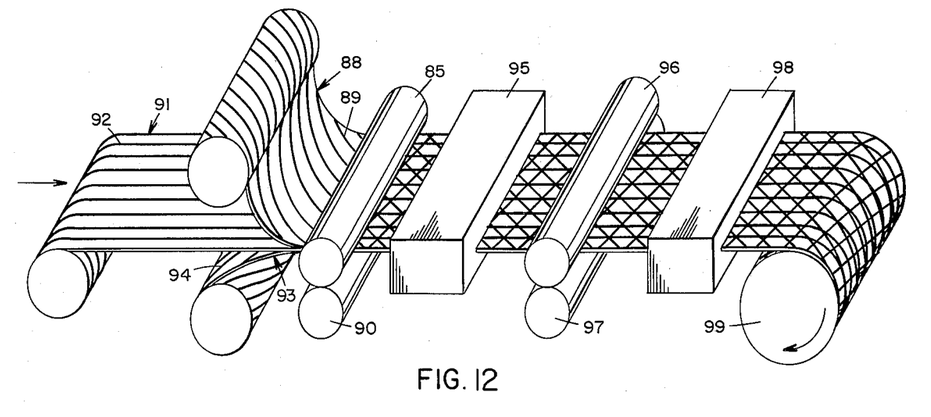
FIG. 12 is a perspective schematic view illustrating other apparatus for making multi-layer fabric structures in accordance with the principles of this invention.

Three or more layer fabrics can also be prepared with the main filaments of each being formed in different directions to provide fabrics having excellent dimensional stability, high strength in all directions and high burst strength. As shown in FIG. 12, a first layer or network structure, generally designated as 88, has main filaments 89 formed at an angle to the machine direction which is indicated by the arrow. A second central layer or network structure 91 has main filaments 92 formed in the machine direction. A third layer or network structure 93 has main filaments 94 formed at an acute angle to the machine direction opposite that of the angle of layer 88. The three layers pass through the nip of rolls 85 and 90, into a preheater 95 and through the nip of two heated calender rolls 96 and 97 which bonds the three layers together at their cross-over points. The bonded fabric may then pass through an annealing unit 98 and is taken up on take-up spool 99. If desired, a conventional tenter or other means could be used to maintain tension in the cross-machine direction during heating and bonding. Such three or more layer fabrics provide strength in all directions and dimensional stability unobtainable in woven, knitted or other nonwoven fabric structures with equivalent weight. Such fabrics provide good stretchability in the cross-machine direction.

Figure 13:
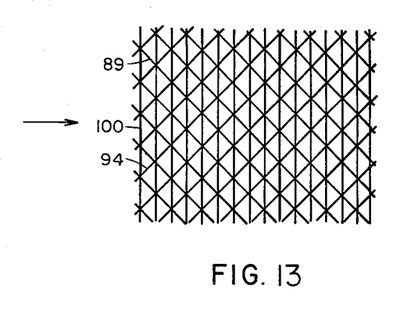
FIG. 13 is a plan view illustrating a portion of a three-layer triaxial fabric with one layer having main filaments formed in the cross-machine direction and the other two layers having their main filaments formed at equal opposite angles to the cross-machine direction main filaments.

Referring to FIG. 13, there is shown a similar three layer fabric, except that it has a central layer having its main filaments 100 in the cross-machine direction. Such a fabric has good stretchability in the machine direction.

Figure 14:
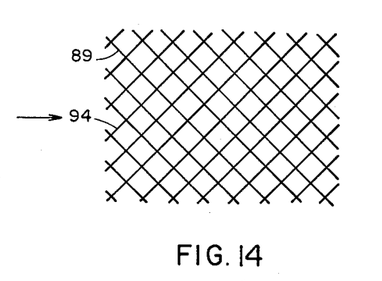
FIG. 14 is a plan view illustrating a portion of two-layer diagonal fabric formed by bonding together two network structures having their main filaments formed at equal opposite angles to the machine direction and desirably, but not necessarily, perpendicular to each other.

If the central network layer 91 shown in FIG. 12 is eliminated, a two-layer fabric such as shown in FIG. 14 is provided having the main filaments 89 on one layer 88 extending at an angle, such as 45° to the machine direction, and the second layer 93 having main filaments 94 extending oppositely at an equal angle to the machine direction. If the main filaments 89 and 94 are formed 45° to the machine direction then main filaments 94 will be perpendicular to the main filaments 89. Such a network structure with the central layer 91 eliminated has stretch and recovery properties in the machine and cross-directions similar to those of a knitted fabric. That is, the fabric will stretch both in the machine and cross-machine direction.

Figure 15:
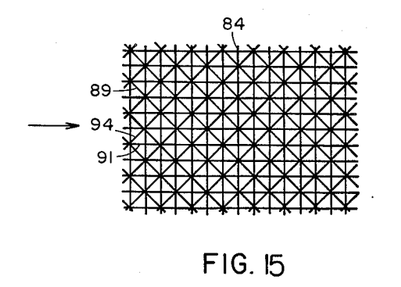
FIG. 15 is a plan view illustrating a portion of a four-layer isometric fabric made by bonding together in any desired order the two layers shown in FIG. 11 and the two layers shown in FIG. 14.

If desired, the three-layer structure of FIG. 12 could be made into a four-layer isometric fabric structure by bonding or laminating as a top layer, a network structure such as 83 shown in FIG. 11 which has main filaments 84 extending in the cross-machine direction. Such a four layer isometric fabric is shown in FIG. 15.

For the most uniform properties in such a fabric, it is preferred that the main filaments 89 and 94 be formed at 45° angles to the machine direction. This fabric is dimensionally stable and has substantially no stretch in any direction.

Figure 16:
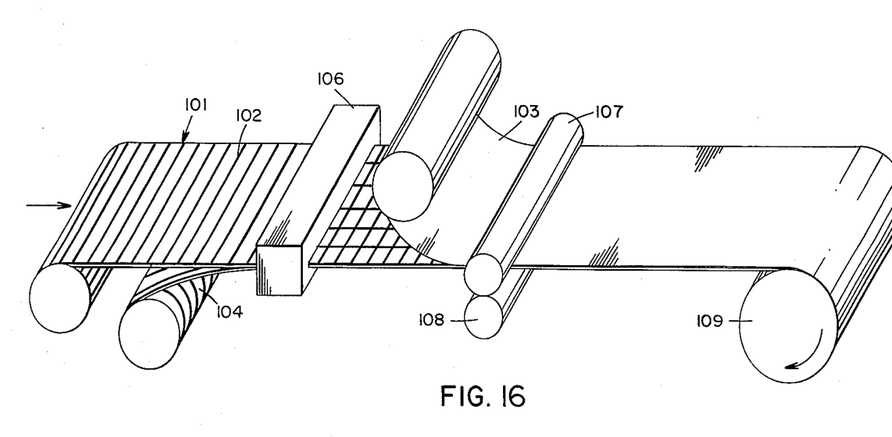
FIG. 16 is a perspective view illustrating apparatus for reinforcing paper, foil, non-woven fabrics or films by utilizing a central network structure made in accordance with the principles of this invention.

Referring to FIG. 16, a single layer plastic network structure, generally designated at 101, having its main filaments 102 formed in the cross-machine direction is bonded between two layers 103 and 104 of paper, film, foil or nonwoven web such as carded, garnetted or air laid fiber webs, or any combinations thereof by first passing the network structure 101 and the layer 104 through an adhesive applicator 106. Then layer 103 is bonded to the other two layers by curing the adhesive as by passing them through a heated zone such as calender rolls 107 and 108, after which the reinforced paper, nonwoven fiber webs, film or foil structure is taken up on take-up spool 109.

It can be appreciated that many different multi-layer fabrics can be prepared in accordance with the principles of this invention by taking one network structure having main filaments in one direction and bonding thereto one or more other networks having main filaments in different directions. Then the layers may be bonded together into a fabric in many ways including applying or spraying an adhesive between the layers and passing them through an oven and calender rolls to bond the layers together, or by passing the layers only through a pair of heated calender rolls to heat bond them together, or by using ultrasonic bonding, or spot bonding or any other known conventional bonding technique.

Among the many uses of the subject network structures, either as single or multi-layer fabrics, are in sanitary napkins, diapers, continence pads, tampons, surgical dressings, surgical sponges, burn dressings, and reinforcing material for paper and paper products, films and other nonwovens and woven fabrics. For example, a network may be used to reinforce masking tape or wallpaper, thereby contributing increased tensile strength and tear resistance properties. In the case of paper and staple fiber nonwovens, the network structures of the type shown in FIG. 16 having main filaments in the cross-machine direction are particularly advantageous. This is because in preparing or making paper or staple fiber nonwovens the fibers therein customarily become oriented in the machine direction and increased strength in the crossmachine direction as well as increased tear resistance in the machine direction is needed. Additionally, the thermoplastic networks can be used as an adhesive in bonding other materials together under heat and pressure. The networks are also usable for fusible inner-liners in shirts and the like, and can be used in place of cheesecloth for the manufacture and processing of cheeses.

The multi-layer fabrics described above are useful for applications similar to those described for the single layer network structures, and particularly useful for those applications in which balanced and high strength and tear resistant porperties are desired. Multi-layer products are particularly useful, for example, for the preparation of high impact resistant plastic bags, primary and secondary tufted carpet backings, plastic coated fabrics, and for other industrial fabric applications. Many other uses are evident for these networks and fabrics which have such properties as not being absorbent, not sticking to wounds or other materials, readily passing liquids therethrough because of the openings in the network structures, and relatively light weight and high strength.

While emphasis has been placed on the high tensile strength and high tear resistance of the subject networks, it is of course apparent that network structures may be made in accordance with the principles of this invention without necessarily drawing the main filaments to a high degree so that network structures may have less strength and tear resistance for applications where those characteristics are not important. In certain applications, texture and smoothness may be more significant than strength. An example of such an application is the use of network structures as a covering in a sanitary napkin wherein it is highly desirable that the network have a soft and smooth texture in order to prevent irritation and also have high permeability to permit fluids to pass and be absorbed by the absorbent inner-material of the napkin.

The subject network structures are very smooth since they do not have any reinforced bosses or thick masses at the crossover points of the main filaments and tie filaments. Such smoothness gives the network a soft hand or feel to make it desirable for many uses wherein irritation of the user or wearer may be an important factor. Additionally, the network structures can be drawn in such a manner as to provide relatively flat structures, that is, a structure having a relatively uniform thickness as measured in the plane perpendicular to the plane of the network. This may be significant for its use as an adhesive where it may be desired to bond two materials together to provide a laminated or bonded fabric having a uniform thickness.

Figure 17:
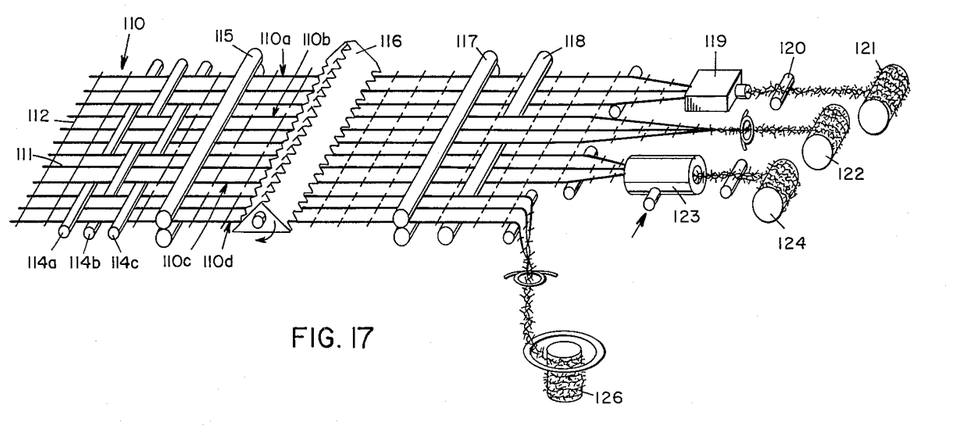
FIG. 17 is a view illustrating apparatus for making network structures into yarns.
Figure 18:
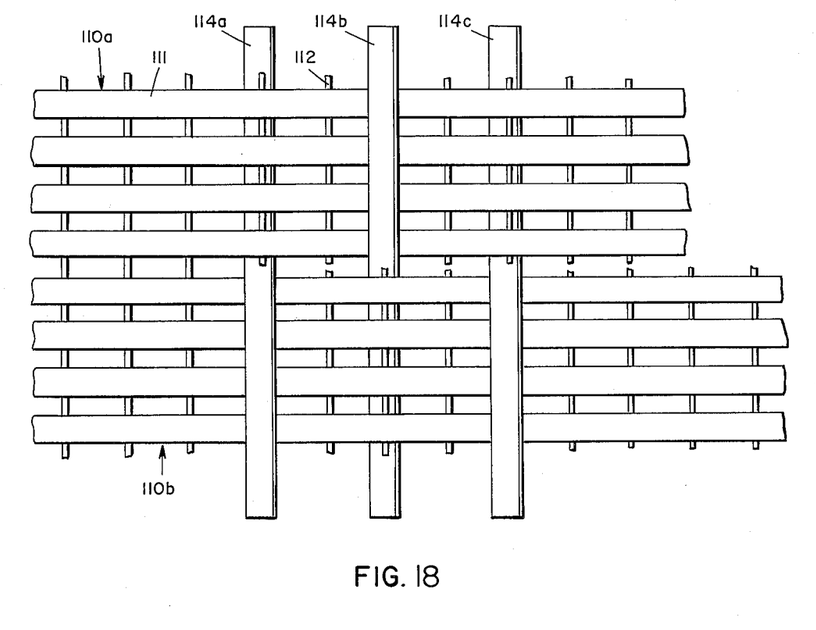
FIG. 18 is an enlarged view of the leasing rods of FIG. 17 used to separate or tear the network structure into strips.
Figure 19:
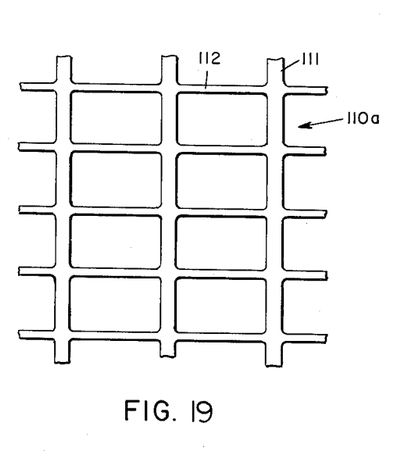
FIG. 19 is an enlarged plan view of a portion of a strip before fibrillation.
Figure 20:
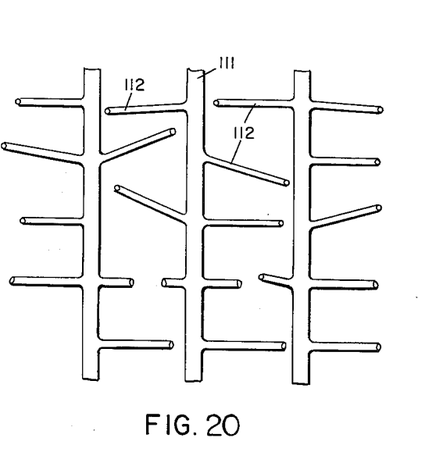
FIG. 20 is an enlarged plan view of the strip of FIG. 19 after fibrillation illustrating the broken tie filaments.
Figure 21:
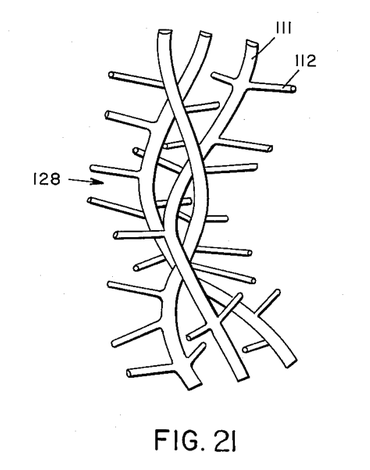
FIG. 21 is a view of a portion of an air jet interlaced multi-filament yarn having protruding side fibers.
Figure 22:
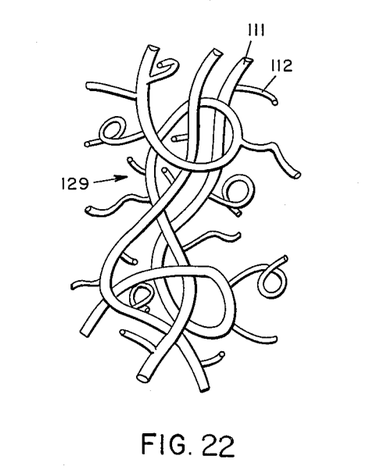
FIG. 22 is a view of a portion of a bulked entangled multi-filament yarn.

It is also possible to make novel monofilaments or yarns from certain of the network structures described above. Referring to FIG. 17, there is shown a network structure generally designated as 110 having main filaments 111 extending in the longitudinal or machine direction and tie filaments 112 extending in the cross-machine direction, 90° to the main filaments 111. Any network structure having its main filaments formed in the machine direction and its tie filaments formed at an angle to the machine direction may be utilized in making monofilaments or yaarns. The network 110 is yarns. by nip rolls 115 through a plurality of lease rods generally designated as 114 to split the network structures into individual filaments or relatively narrow tapes or strips 110a, 110b, 110c, 110d, etc. consisting of a number of main filaments interconnected by tie filaments. The network 110 can easily be split into monofilaments or tapes of any desired width. This is accomplished by initially cutting or tearing the leading end of the network 110 into strips of the desired width and feeding adjacent strips differently through the lease rods 114 so that upon advancement the lease rods tear or split the network as desired. For example, as shown in FIGS. 17 and 18, strip 110a is fed over lease rod 114a, under lease rod 114b, and over lease rod 114c. The adjacent strip 110b is fed or passes under lease rod 114a, over lease rod 114b, and under lease rod 114c. Thus, as strips 110a and 110b advance, the lease rods break the tie filaments interconnecting the adjacent strips. Because of the relative sizes of the main filaments to the tie filaments, the tie filaments break easily upon passing through the lease rods as shown, without need for any cutting or slitting elements. If desired, the strips can then be fibrillated to completely or partially sever the tie filaments such as by passing the strip over a beater bar 116 similar to that described in U.S. Pat. No. 3,495,752. FIG. 19 shows a portion of strip 110a as it looks prior to fibrillation. Complete fibrillation of the network breaks substantially all of the tie filaments, leaving the main filaments intact thereby forming each strip into a yarn consisting of a plurality of individual main filaments which are not interconnected and have protruding portions of tie filaments extending perpendicularly therefrom, or at some other angle if the tie filaments are initially formed at some other angle. FIG. 20 shows a portion of strip 110a after fibrillation with the tie filaments broken. The main filaments are pulled through another set of nip rolls 117 and then may pass over a yarn guide 118 for further processing. The fibrillation by use of a beater bar 116, or by any other means, converts the strips 110a, 110b, etc. either partially or completely into a series of multi-filaments each with protruding normally smaller side filaments attached. If desired, bulking may be effected by known crimping or false twist methods. Also, bulking may be effected by heat relaxation if the main filaments have been prepared from bicomponent polymer sheets. For example, referring again to FIG. 17, the fibrillated strips 110a may be passed from the yarn guide 118 into a heater 119 to provide bulking. If desired, a false twist may be put into the yarns by use of false twisting head 120 after which the yarns are wound on a take-up spool 121. Alternatively, if zero twist yarns are desired, the unfibrillated or fibrillated strip 110b may be wound directly onto a take-up spool 122 as shown in FIG. 17. Alternatively, if desired, a fibrillated strip 110c may be passed through an air-jet interlacer 123 and then wound on a take-up spool 124. If further desired, the fibrillated strip 110d may pass through a conventional down twister 126 and then be wound on a take-up spool. Conventional air-jet entangling may be employed to convert the yarns to a form which can be wound and unwound from a package readily. FIG. 21 illustrates an air-jet entangled or interlaced yarn 128. FIG. 22 illustrates a bulked yarn 129 which is subsequently air-jet entangled. Twister take-up packages may also be used to form compact, readily handleable yarns. Of course, many combinations of these steps such as fibrillation followed by heat relaxation and twisting may be employed.

The unfibrillated strips or tape networks are also useful in untwisted form in weaving or knitting operations where maximum coverage in a light weight but strong fabric is desired. Such weaving or knitting operations can be carried out in line with the strip or tape forming operation.

The yarns prepared in accordance with these techniques are unique in that the main filaments have protruding tie filaments which contribute bulk, cover and a desirable appearance. These yarns are useful for knitting, weaving, tufting and continuous filament nonwoven applications in general. The presence of the side tie filament portions provide improved adhesion of plastic, rubber or other coatings when fabrics prepared from these yarns are subsequently coated. Furthermore, because of the protruding side tie filament portions, the yarns and the fabrics have good abrasion and pilling resistance.

The strips 110 or individual filaments of this invention containing spaced side fibrils may also be cut into staple length fibers. Such staple fibers are of particular advantage for conversion into spun yarns, prepared for example by conventional cotton, wool or worsted spinning processes, or into nonwoven fabrics, prepared for example by conventional cording or air-laying methods. Because of the protruding tie filaments on the staple fibers or on the yarns either made from staple fibers or continuous filaments as described above the nonwoven fabrics, or woven, knit or tufted fabrics prepared from such fibers or yarns are pleasing in appearance, have high thermal insulating value, high moisture absorption, and provide good adhesion to other materials used to bind or coat the fabrics.

In the preceding discussion of the embossing methods, customarily one embossing roll drives the other embossing roll through the melt or sheet with each roll rotating at the same speed. However, when using polymers that are relatively difficult to split spontaneously, such as for example, polyesters, polyamides and vinyl polymers, differential speed embossing rolls can be used to effect incipient splitting of these polymers at the embossing stage. By differential speed, it is meant that the surface speed of the main rib embossing roll is different, from a slight difference up to about a 50 percent difference, either faster or slower, than the surface speed of the tie rib embossing roll. By using differential speed, of the main and tie rib embossing rolls it is possible to bring about splitting of the thin web areas of the embossed sheet at the embossing stage. This facilitates subsequent splitting or opening up into a uniform network structure upon drawing.

The materials that the above network structures, fabrics and yarns can be formed from include any thermoplastic fiber-forming polymers. Among these are polyethylene, polypropylene homopolymer, random copolymers of propylene containing up to 10 percent of another olefin, block copolymers of propylene containing up to 25 percent of another olefin, nylon-6, nylon-66, polyethylene terephthalate, other high molecular weight thermoplastic polyesters, and vinyl polymers such as polyvinyl chloride. Conjugate or bicomponent plastic sheets in which two or more different polymers are extruded together to form sheets containing layers of separate polymers are also possible. For eaxmple, two layers or network structures, each having a portion thereof made of a relatively high melting point polymer with the remaining portion being made of a lower melting point polymer, may be bonded together by placing the lower melting point polymers of each layer together and heating. Alternatively, a network structure made of a higher melting point polymer may be bonded to a network structure made of a lower melting point polymer. Furthermore, a network structure having a portion thereof made of a relatively high melting point polymer with the remaining portion being made of a lower melting point polymer, may be bonded to another network structure being made only of a higher melting point polymer. Particularly desirable are conjugate plastic in which a higher melting point component, such as nylon or polyester, is used to form the main portion of the main fibers. This permits lamination without adhesive of two layers by bonding with heat and pressure or self bulking by heating the network structures or yarns prepared from such structures. Alloys or mixtures of polymers may also be employed.

The principles of this invention are exemplified by the following examples, which are given to illustrate the invention, and are not to be considered limiting in any way.

EXAMPLE 1

Propylene homopolymer with a melt flow index of 7.5 and a randon copolymer of propylene with ethylene containing 2.5 percent ethylene with the same melt index were coextruded through a slit die at 465°F. to form a conjugate sheet in which the homopolymer comprised 75 percent of the thickness of the sheet. The slit die was 12 inches long with an opening 15 mils wide. The molten sheet was passed into the nip of two chrome-plated steel embossing rolls, one 4 inches in diameter, the other 3 inches in diameter, each being 13 inches long. The 4 inch roll had an embossed pattern consisting of a plurality of grooves extending circumferentially around the roll with a spacing of 48 grooves per inch. This roll was internally cooled to maintain its temperature at 70°C. The other 3 inch roll had a pattern of straight grooves extending parallel to its longitudinal axis having a uniform spacing of 111 grooves per inch. This 3 inch roll was not cooled and assumed a temperature of about 60°C. The molten sheet was passed between the two rolls at a rate of 15 feet per minute and went around the 48 grooves per inch roll with 180° contact. The homopolymer side of the conjugate sheet was in contact with the 48 grooves per inch roll. The embossed sheet contained 48 main ribs per inch in the longitudinal direction on one side with the ribs being separated by grooves 10 mils wide. On the other side of the sheet the continuous tie ribs were formed with 111 tie ribs per inch with each pair of tie ribs being separated by grooves 5 mils wide. The maximum thickness of the sheets was 15 mil. The ratio of the cross-sections of the main ribs to the tie ribs was about 2:1 and the ratio of the height of the main ribs to the thickness of the webs between the main ribs was 8:1. The embossed sheet was fed into a tenter heated with circulating air to 110°C. at a speed of 20 feet per minute and it was stretched to twice its width. In this operation, it opened into a uniform network structure, the grooves between the main ribs becoming openings or voids crossed by oriented tie filaments with the main ribs now being separated by about 30 mils. The sheet was then drawn in the linear direction by passing it in frictional contact with a series of 11 steel rolls heated to 120°C. and moving at progressively increasing speeds. The sheet was fed in at 15 feet per minute and exited at 105 feet per minute and accordingly was drawn seven times its length in the machine direction. The resulting network structure had a weight of 0.32 ounce per square yard. The uniformly oriented main filaments were about 45 denier in size. This network structure had a tensile strength of 11 pounds per inch and an elongation of 12 percent in the machine direction. The strength in the cross-machine direction was about 1.9 pounds per inch and the elongation 12 percent. The net was very resistant to tearing in the cross-machine direction, giving a value of 30 pounds when tested by the Finch edge tear method, ASTM D-827.

EXAMPLE 2

Propylene homopolymer with a melt flow index of 7 was extruded at 400°F. through the slit die described above in Example 1. The molten sheet was embossed between two rolls, one being the same as used in Example 1 and containing 111 grooves per inch extending parallel to the rolls longitudinal axis. The other roll had 36 annular grooves per inch extending in the circumferential direction. The ratio of the cross-sectional areas of the main ribs to the tie ribs formed on both sides of the resulting embossed plastic sheet was about 13:1 and the ratio of the height of the main ribs to the thickness of the webs between the main ribs was 5:1. The embossed sheet was then stretched to twice its width in a tenter at 80°C. during which operation regular voids or openings were formed between the main filaments. The sheet was then drawn linearly 9.2 times its length by passing it over a series of differential speed rolls heated to 120°C. The weight of the network structure so formed was 0.45 ounce per square yard. The uniformly oriented main filaments were about 160 denier in size. This network structure had a tensile strength of 22 pounds per inch in the machine direction and an elongation of 12 percent. The strength in the cross-machine direction was 0.8 pound per inch and the elongation was 22 percent. It had excellent tear resistance in the cross-machine direction having a value of 50 pounds when tested by the Finch edge tear method.

EXAMPLE 3

A cross-laid fabric was prepared by bonding the network structure of Example 1 to a similar network structure having the main filaments in the cross-machine direction by pressing the two networks between steel platens in a compression press at a temperature of 270°F. A pressure of 15 p.s.i. was applied for 15 seconds. The fabric so prepared had a weight of 0.7 ounce per square yard and a strength of 10 pounds per inch in one direction and 10 pounds per inch in the opposite direction, the elongation being 12 percent in each case. The fabric had excellent tear resistance in both directions, giving a value of 25 pounds in the machine direction and 25 pounds in the cross-machine direction when tested by the Finch edge tear method. Its Mullen burst strength was 35 p.s.i.

EXAMPLE 4

High density polyethylene with a melt index of 10 was extruded at 450°F. through a slit die 18 inches long and with an opening 15 mils wide. The molten sheet was passed into the nip of two chrome-plated steel embossing rolls, one 4 inches in diameter, the other 6 inches in diameter, each being 15 inches and 20 inches long respectively. The 4 inch roll had an embossed pattern consisting of a plurality of grooves around the roll with a spacing of 75 grooves per inch, with the grooves on the roll being at an angle of 45° to the longitudinal axis of the roll. The 6 inch roll had an embossed pattern consisting of a plurality of grooves around the roll with a spacing of 250 grooves per inch, with the grooves on the roll being also at an angle of 45° to the longitudinal axis of the roll. The temperature of these rolls was internally controlled to maintain around 150°F. The molten sheet was then passed between the two rolls at a rate of 20 feet per minute and had a thickness of 5 mils. A sheet was embossed containing 75 main ribs per inch in the oblique direction on one side with the ribs being separated by grooves 5 mils wide. On the other side of the sheet the tie ribs were formed with 250 tie ribs per inch with each pair of ribs being separated by grooves 1 mil wide. The ratio of the cross-section of the main ribs to the tie ribs was about 13 and the ratio of the height of the main ribs to the thickness of the webs between the main ribs was 3.5:1. The embossed sheet was fed into a linear draw roll which was heated to 120°C. at a speed of 50 feet per minute and it was stretched to three times its length. The sheet was then fed into a tenter heated with circulating air to 110°C. at a speed of 150 feet per minute and it was stretched to 3.0 times its width. In this operation, it opened into a uniform network structure, the grooves between the main ribs becoming openings or voids crossed by oriented tie filaments with the main filaments now separated by about 15 mils. The sheet was then drawn in the linear direction once more by passing it in frictional contact with a series of 11 steel rolls heated to 120°C. and moving at progressively increasing speeds. The sheet was fed in at 115 feet per minute and exited at 150 feet per minute and accordingly was drawn 1.3 times in its length in the machine direction. The resulting network structure had a weight of 0.35 ounce per square yard. The uniformly oriented main filaments were about 90 denier in size.

It is to be understood that the above described embodiments are merely illustrative of applications of the principles of this invention and that numerous other arrangements and modifications may be made within the spirit and scope of the invention.

What we claim and desire to protect by letters patent is:

1. A method of making a network structure comprising:

forming in a thermoplastic polymer sheet a number of parallel continuous main ribs interconnected by webs of reduced thickness extending in a first direction on one side thereof and a greater number of parallel tie ribs on the other side thereof extending in a second direction other than said first direction, the ratio of the cross-sectional area of said main ribs to said tie ribs being at least 1.5:1 and the ratio of the height of the main ribs to the thickness of the webs interconnecting said main ribs being at least 3:1, and drawing said sheet in said first direction to substantially uniformly and continuously orient the main ribs and in another direction transverse to said first direction to orient said tie ribs and to separate said main ribs into main filaments and said tie ribs into tie filaments, said main filaments being continuous and having a substantially uniform cross-section and said tie filaments interconnecting said main filaments to form a uniform network structure.

2. A method of making a network structure as set forth in claim 1 wherein said sheet in drawn in said first direction at least 1.5X.

3. A method of making a network structure as set forth in claim 1 wherein said main ribs and said tie ribs are formed substantially perpendicular to each other.

4. A method of making a network structure as set forth in claim 3 wherein said main ribs are formed substantially parallel to the longitudinal axis of said sheet and said tie ribs are formed substantially perpendicular to the longitudinal axis of said sheet.

5. A method of making a network structure as set forth in claim 3 wherein said main ribs are formed substantially perpendicular to the longitudinal axis of said sheet and said tie ribs are formed substantially parallel to the longitudinal axis of said sheet.

6. A method of making a network structure as set forth in claim 1 wherein said main ribs are formed substantially parallel to the longitudinal axis of said sheet.

7. A method of making a network structure as set forth in claim 1 wherein said main ribs are formed at an angle to the longitudinal axis of said sheet.

8. A method of making a network structure as set forth in claim 7 wherein said ribs are formed substantially parallel to the longitudinal axis of said sheet.

9. A method of making a network structure as set forth in claim 1 wherein said sheet is first drawn at least 1.5X in a direction between 15° and 90° to said first direction and wherein said sheet is subsequently drawn at least 1.5X in a direction perpendicular to said first draw direction.

10. A method of making a network structure as set forth in claim 4 wherein said sheet is drawn at least 1.5 times its width in the cross-machine direction and wherein said sheet is drawn at least 1.5 times its length in the machine direction.

11. A method of making a network structure as set forth in claim 5 wherein said sheet is drawn at least 1.5 times it length in the machine direction and wherein said sheet is drawn at least 1.5 times its width in the cross-machine direction.

12. A method of making a network structure as set forth in claim 7 wherein said main ribs are formed at an angle of 75° or less to the longitudinal axis of said sheet and wherein said sheet is first drawn transverse to the longitudinal axis of said sheet at least 1.5 times and wherein said sheet is subsequently drawn in the machine direction at least 1.5 times.

13. A method as set forth in claim 4 including separating said network structure into a plurality of longitudinal strips each having two or more main filaments therein interconnected by tie filaments.

14. A method as set forth in claim 4 including breaking the tie filaments interconnecting the main filaments of said network structure to form a plurality of individual main filaments, each having portions of tie filaments protruding therefrom.

15. A method as set forth in claim 14 including cutting said individual main filaments into staple length fibers.

16. A method as set forth in claim 13 including fibrillating said strips to break at least some of said tie filaments, and subsequently forming said fibrillated strip into a multifilament yarn.

17. A method of making a network structure as set forth in claim 9 wherein said main ribs and tie ribs are formed by embossing.

18. A method of making a network structure as set forth in claim 17 wherein a first embossing roll is provided to emboss said main ribs and a second embossing roll is provided to emboss said tie ribs and wherein said first embossing roll rotates at a different speed than said second embossing roll to cause cracking in the thin areas of the embossed sheet.

19. A method of making a network structure as set forth in claim 18 wherein the speed of said first embossing roll varies from within 5–50 percent of the speed of said second embossing roll.

20. A method as set forth in claim 4 including breaking the tie filaments interconnecting the main filaments of said network structure to form a plurality of individual main filaments, each having portions of tie filaments protruding therefrom.

21. A method as set forth in claim 4 including separating said network structure into a plurality of longitudinal strips each having two or more main filaments therein interconnected by tie filaments.

22. A method as set forth in claim 21 including weaving the tapes into a woven fabric.

23. A method as set forth in claim 21 including knitting the tapes into a knit fabric.

* * * * *